United States Patent [19]

Limb et al.

[11] 4,091,415

[45] May 23, 1978

[54] METHOD AND APPARATUS FOR DETECTING TEMPORAL CHANGES IN AN OBJECT

[75] Inventors: John Ormond Limb, Tinton Falls, N.J.; Charles Edwin Roos, Nashville, Tenn.

[73] Assignee: Bell Telephone Laboratories, Incorporated, Murray Hill, N.J. ; a part interest

[21] Appl. No.: 774,481

[22] Filed: Mar. 4, 1977

[51] Int. Cl.² ............................................. H04N 7/18
[52] U.S. Cl. ..................................... 358/105; 356/163
[58] Field of Search ........................ 358/105; 356/163

[56] References Cited

U.S. PATENT DOCUMENTS

| | | | |
|---|---|---|---|
| 2,016,036 | 10/1935 | Fitzgerald | 358/105 |
| 3,039,298 | 6/1962 | Zandman | 73/88 |
| 3,488,436 | 1/1970 | Burney | 358/105 |
| 3,527,880 | 9/1970 | Gordon | 358/109 |
| 3,561,870 | 2/1971 | Redpath | 358/105 |
| 3,858,983 | 1/1975 | Foster | 356/163 |
| 3,897,136 | 7/1975 | Bryngdahl | 350/159 |

*Primary Examiner*—Howard W. Britton
*Attorney, Agent, or Firm*—Barry H. Freedman

[57] ABSTRACT

Temporal changes in an object are detected by focusing light from preselected spatial locations of the object on associated first and second regions of a light sensitive target at first and second times, respectively, and by comparing the light intensity focused on the regions. The focusing apparatus includes a Ronchi grating located at an image plane between the object and a light sensitive target. At the first time, light from the object passes through the clear portions of the grating to illuminate alternate parallel stripes on the target, while at the second time, the light passing through the clear portions is shifted to illuminate the regions between the first parallel stripes. The target is then scanned, and information from associated stripes is compared to detect changes. In one embodiment, the shaft can be brought about by the use of a birefringent crystal and polarized light; alternatively, a beam splitter and a shutter arrangement can be used.

21 Claims, 9 Drawing Figures

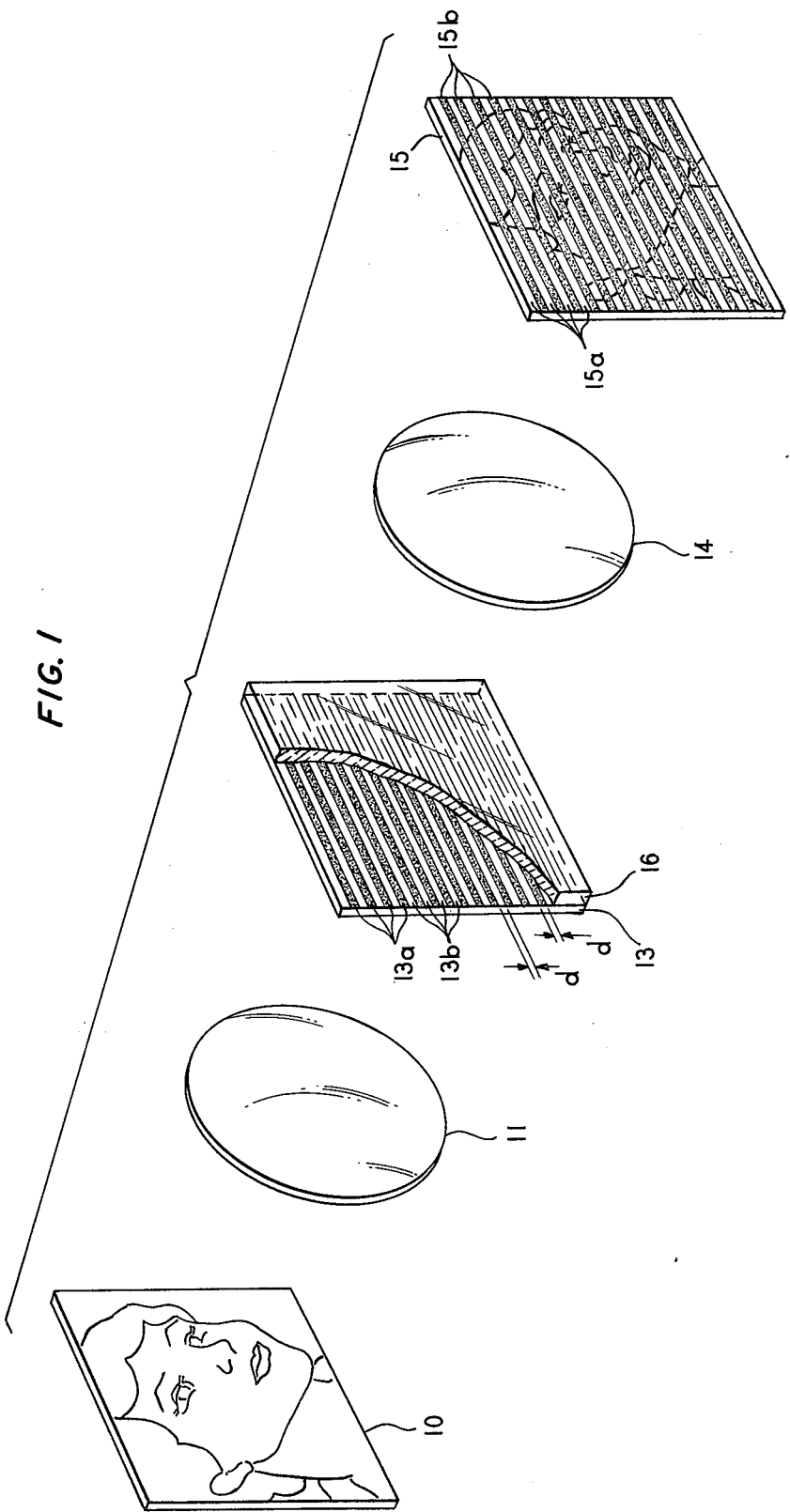

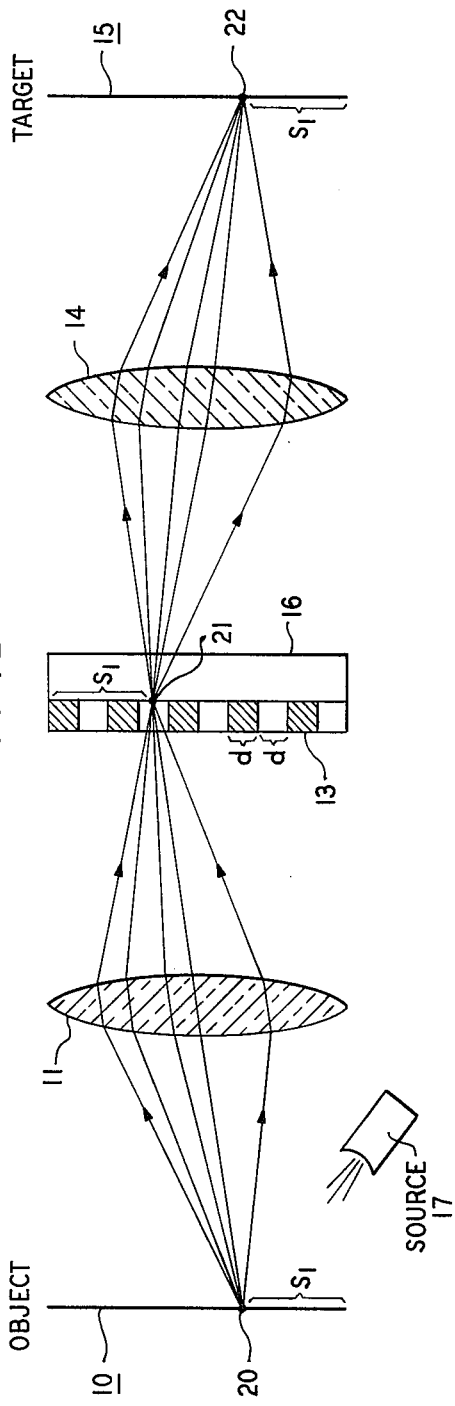
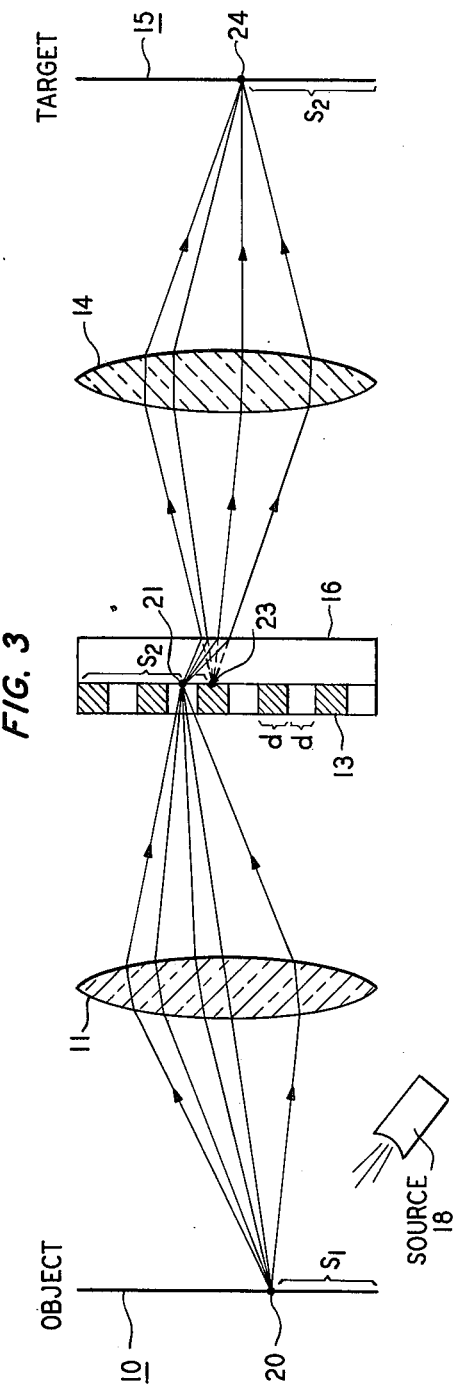

METHOD AND APPARATUS FOR DETECTING TEMPORAL CHANGES IN AN OBJECT

BACKGROUND OF THE INVENTION

1. Field of the Invention

The present invention generally relates to a technique for detecting changes or differences in an object over a predetermined time period.

2. Description of the Prior Art

Various areas of technology require the ability to determine the changes that occur in an object over a predetermined period of time. For example, in certain surveillance systems, the existence of any change in a scene being monitored by, say, a television camera, may indicate the presence of an intruder. In video transmission systems, the ability to detect frame-to-frame changes has been used to eliminate redundant information corresponding to non-varying areas of the object, thus enabling transmission of only data indicative of significant variation. Also, in apparatus such as a bubble chamber used to display the trajectories of atomic particles, the ability to separate time variant information in the monitored object from the stationary background information greatly enhances the usefulness of such apparatus.

One presently known technique for comparing successive frames in a video system to detect temporal changes therein utilizes a frame memory to store information obtained by scanning the first frame. When the second frame is scanned, the information then derived is interleaved with the stored data, and a point-by-point comparison is made. This technique, however, has several disadvantages. First, the frame memory is costly, especially where good resolution requires a large amount of data. Second, data from the first and second frames must be carefully synchronized or registered, so that corresponding points of the object are properly aligned. Third, this technique, while adequate to detect certain changes, is not fast enough for use where comparisons over very short time intervals are necessary, since scanning of the first frame must be completed before the comparison can begin. Moreover, even if scanning is accomplished with separate cameras to reduce time delays, then the cost of the system is further increased, and the registration problem becomes still more difficult.

In view of the above difficulties, it is the broad object of the present invention to efficiently enable the direct comparison of successive images of a time variant object. Additional objects are the provision of such a system in which the differences in an object over a very short time period may be determined, in which a large capacity memory or other data storage apparatus is not required, and in which problems of image alignment or registration are obviated.

SUMMARY OF THE INVENTION

The foregoing and additional objects are achieved in accordance with the present invention by focusing light from preselected spatial locations of an object on associated first and second regions of a light sensitive target such as a T.V. camera vidicon, at first and second times, respectively, and by comparing the light intensity focused on the associated regions. The focusing apparatus may include a Ronchi grating having alternate clear and opaque lines located at an image plane between the object and the light sensitive target. At an initial time, light from the object passes through the clear portions of the grating to illuminate alternate parallel stripes on the target. At a second time, the light passing through the clear portions is shifted to illuminate regions between the first parallel stripes. The target is then scanned, and information from associated stripes is compared to detect changes in the object.

In one embodiment, the shift can be brought about by use of a birefringent crystal and polarized light. If the object is illuminated first with plane polarized light and then with light plane-polarized at right angles to light of the first polarization, with proper orientation of the crystal, the former passes through the crystal without deflection, while the latter is deflected by an amount controlled by the crystal thickness. Alternatively, a beam splitter and shutter arrangement can be used, wherein the light from the grating is split so as to follow two separate paths. At the first time, light in the first path passes the shutter and illuminates the first stripes while the second path is blocked. Conversely, at the second time, light in the second path passes the shutter and illuminates the remaining target stripes, while the first path is blocked.

By virtue of the aforedescribed arrangement of the present invention, it is possible to determine the changes in an object over a time period which may be very short, since the polarized light sources of the shutter can be made to operate quite rapidly. Also, the need for a frame memory is eliminated, since light from the object at different times illuminates separate regions of the target, and is in effect "stored" directly on the target until it is read out and compared. Additionally, since the mechanism for illuminating associated regions of the target with light emanating from preselected spatial locations of the object is quite simple, proper registration or alignment is easily obtained.

BRIEF DESCRIPTION OF THE DRAWING

The present invention and its consequent features and advantages will be more readily apparent by consideration of the following detailed description, when read in light of the accompanying drawing in which:

FIG. 1 is a schematic representation of the optical portion of one embodiment of the present invention;

FIGS. 2 and 3 are side views of the apparatus of FIG. 1, showing the paths followed by light reflected from a particular point on the object at first and second times, respectively;

DETAILED DESCRIPTION

Figure 4:
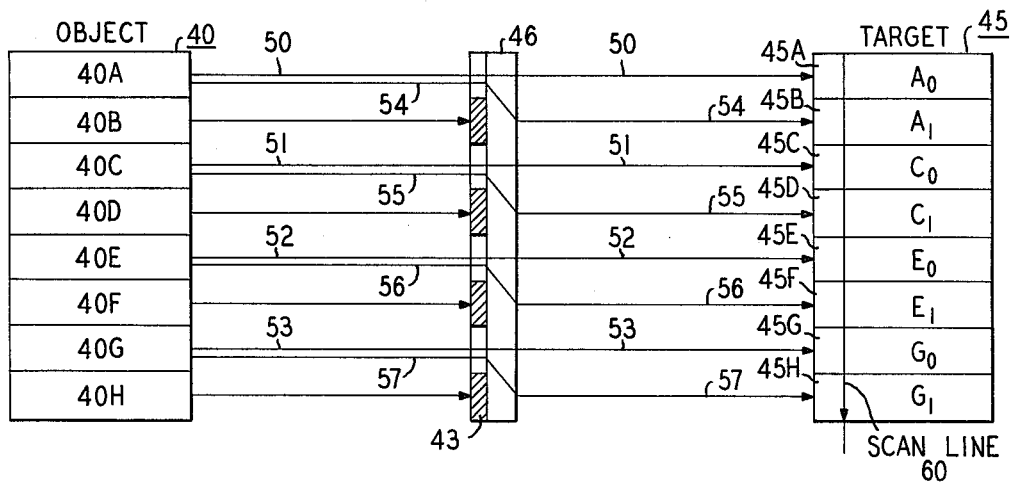
FIG. 4 is a schematic view of the apparatus of FIG. 1, with the lenses removed for convenience, showing the manner in which the target is illuminated.

Referring first to FIG. 1, there is shown a schematic representation of the optical portion of one embodiment of the present invention. This embodiment includes a light sensitive target 15, an object 10 which may vary or change as a function of time, a Ronchi grating 13 located between object 10 and target 15, and a birefringent crystal 16 located immediately behind grating 13.

Crystal 16 may include a thin plate of calcite or crystalline quartz. Ronchi grating 13 consists of a plurality of parallel opaque lines 13A formed on a clear glass plate. For simplicity, the opaque lines 13A and clear lines 13B between the opaque lines 13A are shown as being of equal width "$d$" in FIG. 1. Target 15 may include the surface of a vidicon or T.V. camera.

A first lens 11 is positioned between object 10 and grating 13 so as to focus a real image of object 10 onto the surface of the grating. In a similar fashion, a second lens 14 is positioned between grating 13 and target 15, so as to focus, on the target, an image of the real image that exists in the plane of grating 13. Where necessary, the optical system may be modified by the inclusion of other lenses in addition to lenses 11 and 14. For example, where object 10 is three dimensional (rather than two dimensional as shown in FIG. 1), optics having sufficient depth of field to focus an image of the object onto the surface of the grating 13 would be used.

In accordance with the present invention, detection of temporal changes in object 10 requires the shifting of the light focused on target 15 so that first target regions are illuminated at a first time $t_0$, and second target regions adjacent to the first regions are illuminated at a second time $t_1$. In this embodiment, the shift is accomplished by the use of polarized light, in conjunction with birefringent crystal 16.

Generally speaking, a birefringent crystal, sometimes referred to as a doubly refracting or anisotropic crystal, exhibits different propagation velocities for different directions through the crystal. Two sets of wavelets propagate from every wave surface in such a crystal, one set being spherical and the other ellipsoidal. The two sets are tangent to each other in one direction, called the optic axis of the crystal. For an optic axis at a 45° angle to the crystal surface, a light ray polarized in a direction tangent to the spherical wavelets is called an "ordinary" ray; this ray is undeviated as it traverses the crystal. On the other hand, a light ray polarized in a direction tangent to the ellipsoids is called an "extraordinary" ray; this ray is shifted or deviated a maximum amount as it traverses the crystal. For polarization between the ordinary and extraordinary directions, an intermediate amount of shift is produced. The absolute amount that a polarized ray is shifted is dependent not only on the polarization direction but also on the thickness of the crystal being used. For example, a plate of calcite 1.15 mm thick will shift an extraordinary ray 1.27 mm, corresponding to the grating spacing "$d$" of a 100 lines per inch Ronchi grating 13.

The mechanics of the shifting outlined above will be better appreciated by reference to FIGS. 2 and 3, which are two dimensional side views of the optical apparatus of FIG. 1. In FIG. 2, object 10 is illuminated by a light source 17 which emits a brief flash of light polarized in a first direction (the ordinary ray direction) so as to produce no shift during passage through crystal 16. In FIG. 3, the object is illuminated by a different light source 18 which emits a brief flash of light polarized in a second direction (the extraordinary ray direction) which does produce a shift or deviation during passage through crystal 16. At time $t_0$, when source 17 is flashed, light reflected from an arbitrary spatial location, on object 10, for example point 20, is collected by lens 11 and focused to form a real image at a point 21 of grating 13. Since grating 13 does not contain an opaque line at point 21, the light enters crystal 16. No shift or deviation occurs in passage through the crystal, and rays emerging therefrom are collected by lens 14 and focused onto a point 22 on target 15. Some paths followed by light rays travelling from point 20 to point 22 are shown in FIG. 2; these paths of course are exemplary. It will be noted that points 20 and 22 are spaced a distance $S_1$ from the bottom edge of object 10 and target 15, respectively. Point 21 is spaced the same distance $S_1$ from the top edge of grating 13, due to the reversal caused by lens 11.

At time $t_1$, when light source 18 is flashed, the paths followed by light rays from point 20 to point 21 are the same as described above. However, as the light traverses crystal 16, it is shifted due to the birefringent quality of the crystal. As shown in FIG. 3, light emerging from the crystal appears to come from a point 23 which is offset from point 21 by a shift distance $d$ (i.e., $S_2 = S_1 + d$). This light is collected by lens 14, and focused on point 24 of target 15. Due to the shift, point 24 is also spaced a distance $S_2$ from the bottom edge of the target 15 where $S_2 = S_1 + d$.

To summarize the foregoing, the apparatus of FIG. 1 operates to focus light from a spatial location (point 20) of object 10 on a first location (point 22) on target 15 at a first time $t_0$, when source 17 is flashed, and to focus light from the same spatial location on a second location (point 24) on target 15 at a second time $t_1$, when source 18 is flashed.

When the entire object 10, rather than a single point thereon, is considered, it will be seen from FIG. 1 that at time $t_0$, light reflected from object 10 is focused on a plurality of parallel lines or regions 15a on target 15; the remainder of target 15 consists of non-illuminated lines or regions 15b, since the opaque strips of grating 13 occlude or prohibit passage of light from the object 10 to these lines or regions. The light that is focused on the illuminated regions of target 15 originated in a corresponding plurality of regions of the object 10; these regions will hereafter be referred to as the "active" regions of object 10; although it is to be understood that this nomenclature does not imply that only parts of the object vary temporally. The light that would have been focused on the non-illuminated regions (but which was blocked or occluded by the opaque lines of grating 13) originated in the remaining regions of object 10; these regions of object 10 will be referred to as "inactive"; although it is again to be made clear that these regions can vary temporally. At time $t_1$, light reflected from the active regions of object 10 is shifted during its passage through crystal 16. By appropriately choosing the amount of the shift, the light passing through grating 13 is then made to illuminate what had previously been the non-illuminated regions 15B of the target, so that at time $t_1$, the target contains a composite image depicting only the active regions of object 10 at the different times $t_0$ and $t_1$.

The composite nature of the image formed on the target is further illustrated in FIG. 4, in which the lenses are removed for convenience. A two dimensional object 40 is shown as divided into a plurality of parallel regions 40A through 40H. The regions 40A, C, E and G may be considered active, since images of these regions are focused on the clear spaces of a grating 43; the regions 40B, D, F and H may be considered inactive, since images of these regions are filtered out or blocked by opaque lines of grating 43, preventing light from these regions from reaching target 45. If the object is three dimensional, the same analysis would apply.

When the object 40 is illuminated at time $t_0$ with light of a first polarization, the image of regions 40A, C, E and G is focused on regions 45A, C, E and G, respectively of a target 45. The subscript 0 is used on the target to denote the picture content of the object regions at time $t_0$, and the arrows 50, 51, 52 and 53 indicate schematically the paths followed by the light. It is noted that no deviation occurs during light passage through birefringent crystal 46.

When the object is illuminated at time $t_1$ with light of a second polarization, the image of regions 40A, C, E and G is focused on regions 45B, D, F and H of the target 45. The subscript 1 is used on the target to denote the picture content of the object regions displayed at time $t_1$, and the arrows 54, 55, 56 and 57 indicate schematically the paths followed by the light from the object to the target. In this case, light passing through crystal 46 is deviated by an amount equal to one grating spacing.

Inspection of target 45 shows that the image formed thereon consists of a representation of spatial locations of the object (regions A, C, E and G) at a first time ($A_0$, $C_0$, $E_0$ and $G_0$), interleaved with a representation of the same spatial location at a second time ($A_1$, $C_1$, $E_1$ and $G_1$). Stated differently, the image in target regions 45A and 45B represents the associated portion of the object in region A, at times $t_0$ and $t_1$, respectively; the image in target regions 45C and 45D represents the associated portion of the object in region C, at times $t_0$ and $t_1$, respectively, and so on. Thus, to detect a change in region A of object 40, target regions 45A and B may be subtracted from each other or compared; to detect a change in region C of the object, regions 45C and D of the target can be compared. Upon subtraction, non-variant information is cancelled, and only changes are observed.

Before proceeding with a description of the apparatus that is used for making the subtraction or comparison, it is to be observed that the image of object 40 focused on target 45 at time $t_0$ represents only alternate portions of the object, namely the portions referred to above as "active"; since images of the "inactive" portions of the object are filtered out or occluded by the opaque lines of the grating. The resolution of the image is thus theoretically half that of the object, where the clear and opaque lines of the grating are of equal width. This resolution loss is not, however, detrimental to overall system operation. Indeed, cameras having a resolution of 1,000 elements × 1,000 lines are commercially available, and would permit division of the object into as many as 1,000 lines each of 250 elements without developing significant resolution difficulties. Further, resolution may be improved by adjusting the rate at which the image stored on the target is scanned, and any resolution loss which still remains is outweighted by the other advantages of the present invention.

Figure 5:
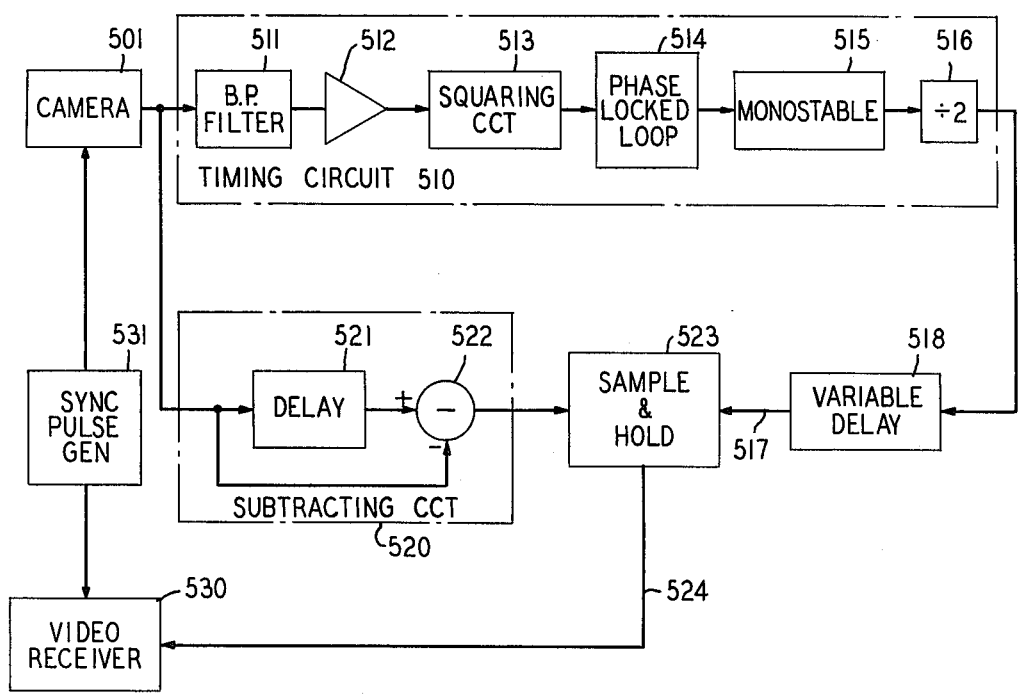
FIG. 5 is a schematic diagram of the circuitry used to scan the target of FIG. 4 to detect changes in the object.

Processing of the image stored on the target 45 of FIG. 4 to detect temporal changes in the object 40 may be accomplished using the circuitry shown in schematic form in FIG. 5. Briefly, the circuitry includes a camera 501 for scanning the target in a direction perpendicular to the the target regions 45A-H of FIG. 4, a timing circuit 510 for extracting from the camera output a series of pulses indicative of the correct intervals at which comparisons may be made between the two target regions associated with each active object region, and a subtracting circuit 520 for actually carrying out the comparison.

As shown in FIG. 5, timing circuit 510 includes a bandpass filter 511 coupled to the output of camera 501 for initially filtering the video signal output so as to block the passage of frequency components associated with the actual picture content of the regions being scanned and to permit the passage of only those frequency components indicative of the rate at which the regions are being scanned. The center frequency of filter 511 is selected based upon the scan rate of camera 501 and the number of regions being scanned. For example, if camera 501 is arranged to scan at a rate of 30 frames per second with each frame consisting of 270 scan lines and if the grating focuses a total of about 75 regions on the target, a center frequency of $270 \times 30 \times 75 \approx 600$ KHz will be used. The output of filter 511 is amplified in an amplifier 512 and then applied to a threshold or squaring circuit 513, which serves to detect zero crossings and to provide a square wave output having the same fundamental frequency as the output of amplifier 512. The output of circuit 513 is next applied to a phase locked loop 514 which is designed to provide an output which follows in frequency of the input applied thereto, but which removes or ignores short term or transient fluctuations in frequency caused by noise or spurious signals. The output of the phase locked loop is used to trigger a monostable timing circuit 515, which generates a stream of pulses phased to coincide with the scanning of each target region. Since it is desired to make a comparison between only every other pair of adjacent target regions, i.e., those which correspond to a particular object region, the pulse stream output of circuit 515 is applied to a divide-by-2 circuit 516. Accordingly, if target 45 of FIG. 4 is scanned along a line 60 running from top to bottom, timing pulses on line 517 exist when regions 45B, D, F and H are scanned.

In the subtracting circuitry 520, the unfiltered output from camera 501 is applied directly to one input of a subtracting circuit 522, and to the other input of the subtracting circuit via a delay element 521. The amount of delay used in element 521 is the length of time required to scan one target region; using the scan rate and grating geometries stated previously, a delay of $1/(30 \times 75 \times 270) = 1.6 \mu s$ is appropriate. The output of subtracting circuit 522, which is a running or continuous difference between points on the scan line which are separated by the width of a single region, is applied to the input of a sample and hold circuit 523. This circuit receives timing pulses from line 517 from the output of divider 516, and allows the difference signal to be passed to an output line 524 only at the appropriate instants, i.e., when corresponding target regions are being compared. A display device such as video receiver 530 is arranged to receive the output from circuit 523, for display purposes. A computer or other utilization device could alternatively be used. Synchronization between the camera 501 and the receiver 530 is maintained by signals applied to both from a sync pulse generator 531.

Since the circuitry shown in FIG. 5 is quite simple, it will be apparent to those skilled in the art that various other arrangements may be used with equal success, and that various refinements may be added. For example, a delay circuit 518 may be inserted in line 517 to compensate for the transmission delays within timing circuit 510; ideally, the pulses on line 517 will be timed to coincide with the centers of the regions being scanned. In addition variations in the widths of the regions being scanned or in the scan rate itself may be accounted for by suitably adjusting the delay of element 521 in response to frequency changes detected by phase locked loop 514, or by using line to line correlations in the video signal to assist in the extraction of timing signals. As an alternative to the circuitry of FIG. 5, it may be found advantageous to scan the target in a direction parallel rather than perpendicular to the regions. In this event, scanning would proceed along the length of region 45A of FIG. 4, with the information obtained being stored in a line memory. Subsequently, region 45B would be scanned, and an output signal generated indicating the difference between the present and previous lines. The process would then be repeated, forming, in turn, differences between lines 45C and D, 45 E and F, and so on.

Figure 6A:
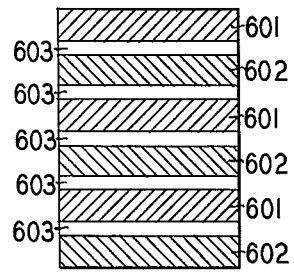
FIGS. 6A, B and C illustrate alternate patterns which may be displayed on the target by making slight modifications to the apparatus of FIGS. 1 and 4.
Figure 6B:
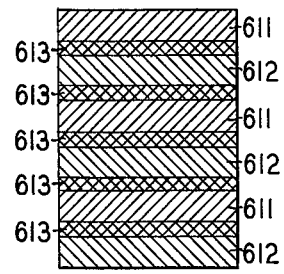

In order to assist the timing circuitry 510 of FIG. 5 in extracting from the video signal output of camera 501 a frequency component indicative of the rate at which the target regions are being scanned, it may be advantageous to modify the Ronchi grating so that the width of the opaque lines is slightly greater than the width of the clear spaces which separate the opaque lines. With this modification, the illumination pattern of the target would appear as shown in FIG. 6A: regions 601 would be illuminated at time $t_0$, regions 602 would be illuminated at time $t_1$, and stripes or spaces 603 between each of the regions would not be illuminated at all. When the target is scanned in a direction perpendicular to the regions, the video output signal will be rich in components of twice the stripe frequency, since that signal will alternate between picture data and no data. As an alternative to the foregoing, the Ronchi grating may be arranged so that the width of the opaque lines is slightly less than the width of the clear spaced therebetween. In this event, the illumination pattern would be as shown in FIG. 6B; regions 611 would be illuminated at time $t_0$, regions 612 would be illuminated at time $t_1$, and stripes 613 between the regions would appear quite dark compared to the remainder of the target, due to the overlaps of regions 611 and 612. Again, the video output signal would then be quite rich in components having twice the stripe frequency; and could be readily processed to yield the desired timing pulses.

Figure 6C:
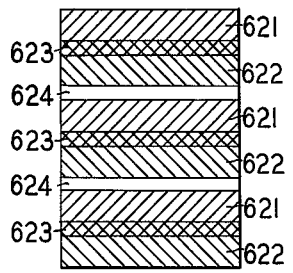

Instead of varying the width of the Ronchi grating lines, a similar result can be achieved by adjusting the birefringent crystal thickness or the directions of polarization used so as to produce a relative shift of either slightly less or slightly more than one grating width. Where the shift is less than the grating width, the target illumination pattern is shown in FIG. 6C: the regions 621 illuminated at time $t_0$ share common or overlap areas 623 with the regions 622 illuminated at time $t_1$, while, non-illuminated spaces 624 exist between each pair of illuminated regions. A similar pattern would be produced when the crystal shift is slightly more than a grating width. In either case, this illumination pattern again produces a video signal from which frequency components at the desired timing frequency are easily extracted. It is also to be noted here that while the foregoing embodiment provides for no shift of light at $t_0$, with a shift occurring only at $t_1$, successful results are achieved as long as the amount of shift produced at the beginning and end of the observation interval $t_1-t_0$ are different, relative to each other.

The width and relative displacement of the target regions are only two of the factors to be considered in extracting the timing signal from the camera output. Also involved are the horizontal/vertical resolution of the camera scan, the balance of light intensity between the two exposures at $t_0$ and $t_1$, and the linearity of the luminance voltage characteristic of the camera. The effect of resolution on accuracy of timing is obvious: with greater resolution, the timing signal is more easily extracted from the video waveform. Resolution can be varied by, for example, exchanging the horizontal and vertical directions (i.e., rotating the grating by 90°). With respect to light intensity balance, it is to be observed that by intentionally creating an imbalance, the resulting signal will contain a larger frequency component directly related to the image of the grating. However, in the comparison circuitry 520, the intensity or amplitudes must then be readjusted electronically to the same value prior to subtraction, and nonlinearities in the camera luminance-voltage characteristic must be accounted for so that the non-time variant portions of the images will cancel exactly.

Figure 7:
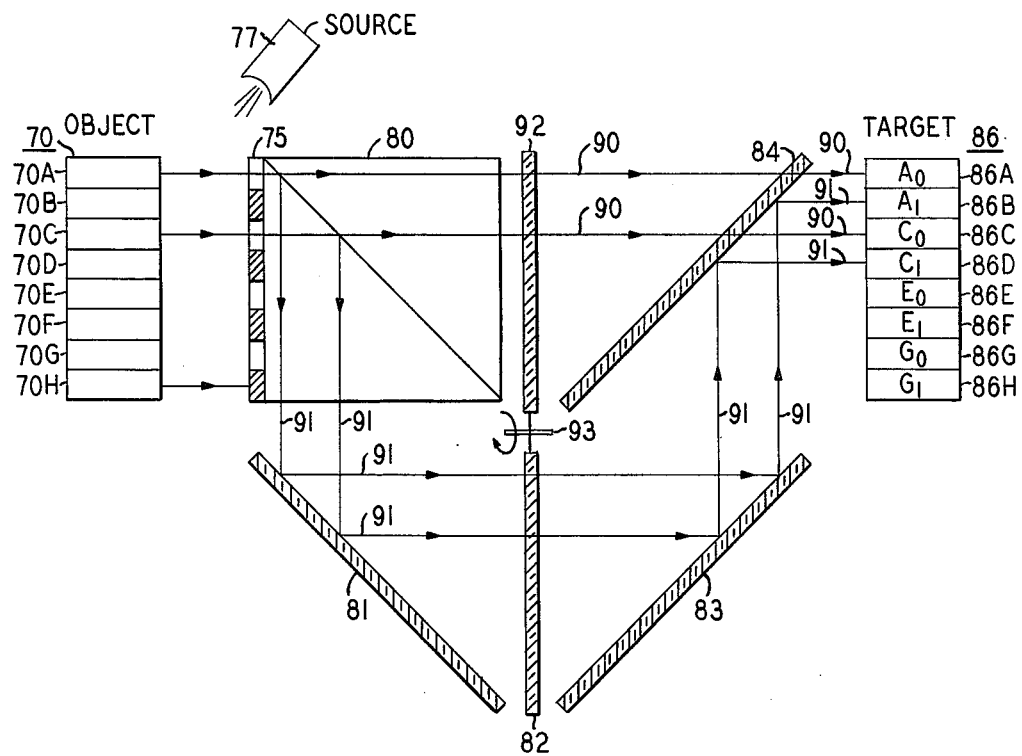
FIG. 7 is a schematic representation of the optical portion of another embodiment of the present invention.

In certain situations, particularly those in which polarized light cannot be used for object illumination, it may be necessary to replace the birefringent crystal with other shifting means that are compatible with the use of ordinary light. One such arrangement, which employs mechanical shutters, is shown in schematic form in FIG. 7. In this embodiment, object 70 is illuminated by an ordinary light source 77, and a lens (not shown) is arranged to focus a real image of the object in the plane of a Ronchi grating 75. The light passing grating 75, which originated at the "active" object regions 70A, C, E and G, is split into two parts by a beam splitter 80, and the parts follow separate paths in reaching a target 86. The first path, shown by an exemplary ray 90 extends from the beam splitter to the target via shutter 92 which is open at time $t_0$; light in this path illuminates a first set of parallel target regions 86A, C, E and G. The second path extends from beam splitter 80 to target 86 via mirror 81, shutter 82, mirror 83 and mirror 84, as shown by exemplary ray 91; by properly positioning the mirrors and by opening shutter 82 at time $t_1$, light in this path is made to illuminate the remaining regions 86B, D, F and H of the target. The shutters 82 and 92 can be operated independently, or may be interconnected mechanically. For example, the shutters can comprise clear and opaque windows formed on the surface of a wheel which spins on an axle 93 so that the windows alternately intersect the first and second light paths. Thus, rays 90 would pass through the clear window at time $t_0$, while rays 91 are blocked by the opaque window; at time $t_1$, the windows would be reversed, with rays 91 reaching the target. The composite image of the object regions 70A, C, E and G formed on the target 86 is the same as the composite image formed on the target 45 of FIG. 4, using the optical apparatus of FIG. 1. and the subscripts on the target again indicate the content of the image focused on the target.

Changes in object 70 are detected by scanning the target 86 using the same apparatus as that shown in FIG. 5. In this embodiment also, the output of the camera desirably would contain a strong component exhibiting the stripe frequency. For this prupose, the amount of offset between associated target regions can be adjusted by small changes in the alignment of mirrors 81, 83 or 84. Also, the spacing and width of the opaque lines in Ronchi grating 75 can be adjusted.

It will be apparent to those skilled in the art that various modifications and adaptations can be made to the above-described embodiments of the present invention without departing from the spirit and scope of the invention as a whole. Accordingly, it is intended that the invention be limited only by the following claims.

What is claimed is:

1. Apparatus for detecting intensity changes between a first and a second time, at selected spatial locations of an object, comprising:
   a light sensitive target;
   means disposed between said object and said target for focusing light from each of said selected spatial locations of said object on respective associated first regions of said target at said first time, and on respective associated second regions of said target at said second time; and
   means for comparing the light focused on the first and second target regions associated with at least one of said selected spatial locations of said object to detect said changes.

2. The invention defined in claim 1 wherein said focusing means includes (1) a planar grating having alternate clear and opaque lines, and (2) means for focusing a real image of said selected locations on said clear lines.

3. The invention defined in claim 2 wherein said focusing means further includes (3) a birefringent crystal disposed between said grating and said target, and (4) means for illuminating said object with light polarized in first and second directions at said first and second times, respectively,
   whereby light from said selected locations passing through said clear lines is deflected by said crystal a first amount at said first time and a second amount at said second time.

4. The invention defined in claim 3 wherein said clear and opaque lines are of equal width "d" time by an amount "d". and the difference between said first and second deflection amounts is "d".

5. The invention defined in claim 2 wherein said focusing means further includes (3) a beam splitter disposed between said grating and said target, said beam splitter being arranged to route light from said selected locations passing through said clear lines on a first path to said first target regions and on a second path to said second target regions, and (4) means for permitting light passage in said first and second paths only at said first and second times, respectively.

6. The invention defined in claim 1 wherein:
   said target includes a vidicon, and said comparing means includes:
   (1) a camera for scanning said vidicon to generate a video signal alternately indicative of the light intensity focused on said first and second target regions;
   (2) means for generating a delayed version of said video signal; and
   (3) means for generating a difference signal indicative of said changes in said object by subtracting said video signal from said delayed version of said video signal.

7. Apparatus for detecting temporal intensity changes in a portion of an object comprising:
   a light sensitive target;
   first means for forming an image of said object portion on first and second regions of said target at first and second times, respectively; and
   second means for comparing said image on said first and second regions to detect said changes.

8. The invention defined in claim 7 wherein said first means includes (1) a grating located between said object and said target, said grating having alternate clear and opaque parallel lines formed thereon, and (2) third means for focusing a real image of said object portion on said clear lines of said grating.

9. The invention defined in claim 8 wherein said first means further includes (1) a birefringent crystal disposed between said grating and target, (2) a first source of light polarized in a first direction, (3) means for energizing said first source at said first time, whereby said image of said object portion formed on said first target regions comprises light reflected from said object portion which passes through said crystal without deflection, (4) a second source of light polarized in a second direction orthogonal to said first direction, and (5) means for energizing said second source at said second time, whereby said image of said object portion formed on said second target region comprises light reflected from said object portion which is deflected during passage through said crystal.

10. The invention defined in claim 9 wherein said clear and opaque lines of said grating are of substantially equal width $d$, and said crystal is arranged to deflect light from said second source passing through said crystal by an amount substantially equal to $d$.

11. The invention defined in claim 8 wherein said first means further includes (1) fourth means for splitting light passing through said clear lines of said grating into first and second parts, (2) fifth means for routing said first part to said first target regions on a first path, (3) sixth means for routing said second part to said second target regions on a second path, and (4) seventh means for blocking said second path at said first time and for blocking said first path at said second time.

12. The invention defined in claim 7 wherein said second means includes (1) a camera for generating a video signal by sequentially scanning said first and second target regions, (2) means for generating a version of said video signal delayed by an amount of time needed to scan said first region, and (3) means operable for subtracting said video signal from said delayed version of said video signal.

13. The invention defined in claim 12 wherein said second means further includes means for extracting from said video signal a timing signal indicative of the rate at which said first and second regions are scanned, and means for operating said subtracting means in response to said timing signal.

14. Apparatus for detecting intensity changes at a plurality of spatial locations of an object between first and second times, comprising:
   a light sensitive target;
   first means for focusing an image of said spatial locations on first regions of said target at said first time;
   said first means including second means for shifting light travelling from said object to said target so as to focus light from said spatial locations on second regions of said target at said second time, said first and second regions being alternate stripes on said target;
   third means for sequentially scanning said stripes to develop a composite signal alternately containing first and second data representative of the light intensity of said preselected spatial locations of said object at said first and second times, respectively; and fourth means for comparing said first and second data to detect said changes.

15. The invention defined in claim 14 wherein:
said first means further includes (1) a grating disposed between said target and said object, said grating having a plurality of clear and opaque lines formed thereon, and (2) means for illuminating said object with light of ordinary polarization at said first time, and
wherein said second means includes (1) a birefringent crystal disposed between said grating and said target and (2) means for illuminating said object with light of extraordinary polarization at said second time.

16. Apparatus for detecting intensity changes which occur in selected spatial locations of an object between first and second times, said apparatus including:
a light sensitive target;
means for filtering light reflected from said object so as to illuminate, at said first time, first alternate parallel regions of said target;
means for shifting light passing through said filtering means so as to illuminate, at said second time, second alternate parallel regions of said target, said second regions being interlaced between said first regions;
means for scanning said target in a direction perpendicular to said regions to generate a signal alternately indicative of the intensity of particular ones of said spatial locations at said first and second times; and
means for comparing said alternate indications to detect and changes.

17. The invention defined in claim 16 wherein said filtering means includes a grating having a plurality of opaque stripes separated from each other by transparent stripes.

18. The invention defined in claim 17 wherein said shifting means includes a doubly refracting crystal disposed between said grating and said target, and wherein said object is illuminated by light plane polarized in first and second directions at said first and second times, respectively.

19. Apparatus for detecting changes in an object comprising:
first means including parallel opaque spaced apart stripes for filtering portions of light reflected by said object and for transmitting the remaining portions of said light;
a light sensitive target for receiving said light at a first time $t_1$, said light illuminating a first series of parallel spaced apart regions of said target;
means for shifting said remaining portions of said light at a second time $t_2$, said light illuminating a second series of parallel spaced apart regions of said target each of which corresponds to and is interleaved between ones of said first series of regions; and
means for comparing corresponding ones of said first and second regions to detect said changes.

20. A method of detecting intensity changes between a first and a second time, at selected spatial locations of an object, comprising the steps of:
(1) focusing a real image of said object on a grating having alternate clear and opaque lines formed thereon, whereby light from said selected spatial locations passes through said clear lines;
(2) focusing said light passing through said clear lines on respective first regions of a light sensitive target at said first time and on respective second regions of said target at said second time; and
(3) comparing the light focused on the first and second target regions associated with at least one of said selected spatial locations to detect said changes.

21. The method defined in claim 20 wherein a birefringent crystal is located between said grating and said target, and wherein said second focusing step includes:
(1) illuminating said object with light polarized in a first direction at said first time; and
(2) illuminating said object with light polarized in a second direction at said second time.

* * * * *